June 19, 1951     I. JEPSON     2,557,437
MAGAZINE TYPE RECORDING APPARATUS
Filed Feb. 17, 1945     4 Sheets-Sheet 1
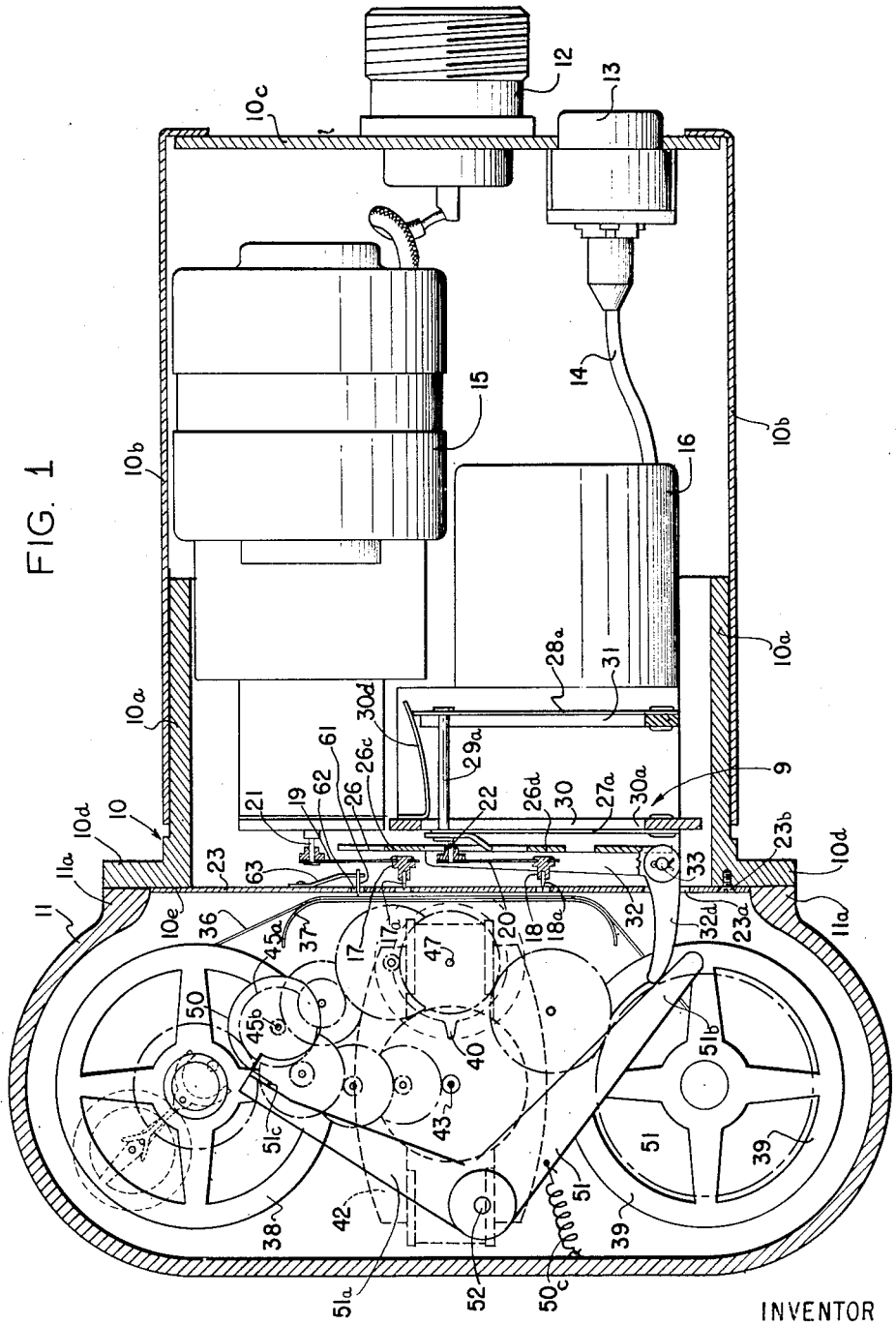
INVENTOR
IVAR JEPSON
BY
*McCanna & Morsbach*
ATTORNEYS June 19, 1951     I. JEPSON     2,557,437
MAGAZINE TYPE RECORDING APPARATUS
Filed Feb. 17, 1945     4 Sheets-Sheet 2
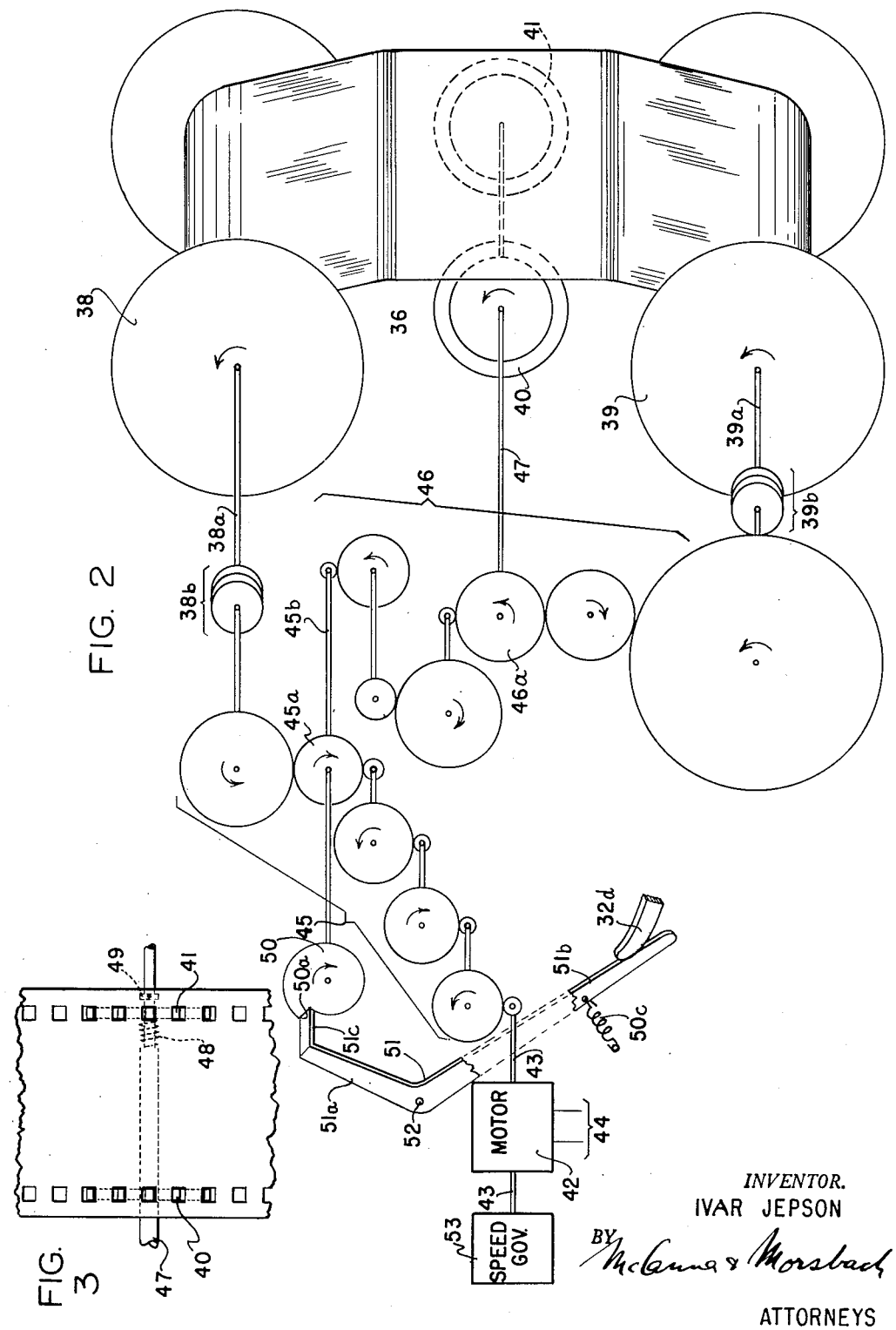
*INVENTOR.*
IVAR JEPSON
ATTORNEYS June 19, 1951     I. JEPSON     2,557,437
MAGAZINE TYPE RECORDING APPARATUS
Filed Feb. 17, 1945     4 Sheets-Sheet 3
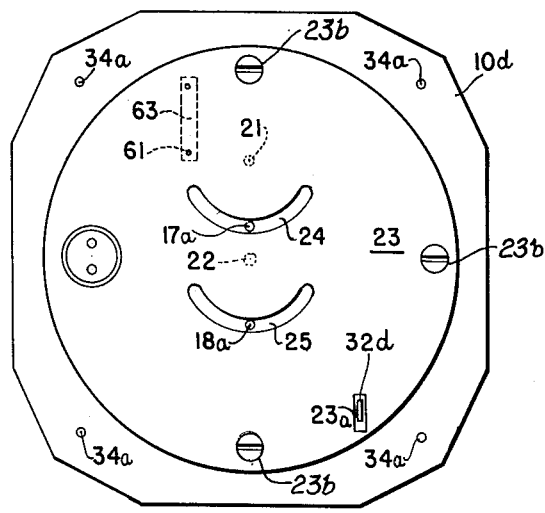
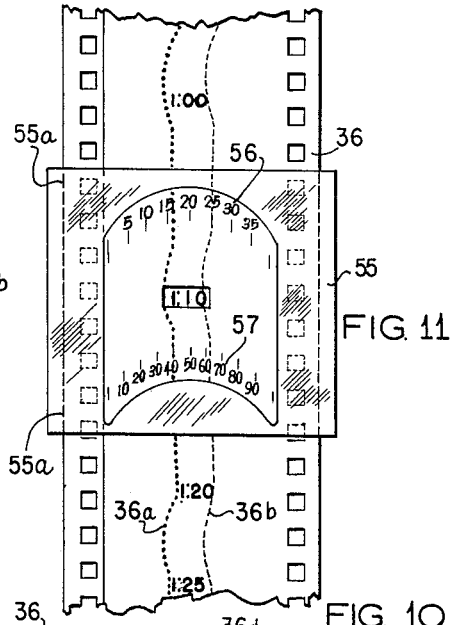
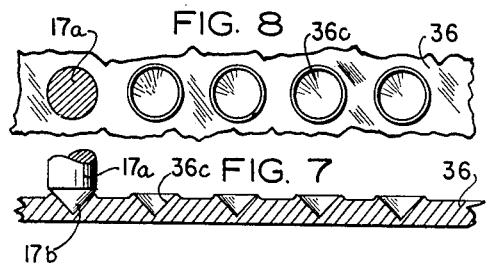
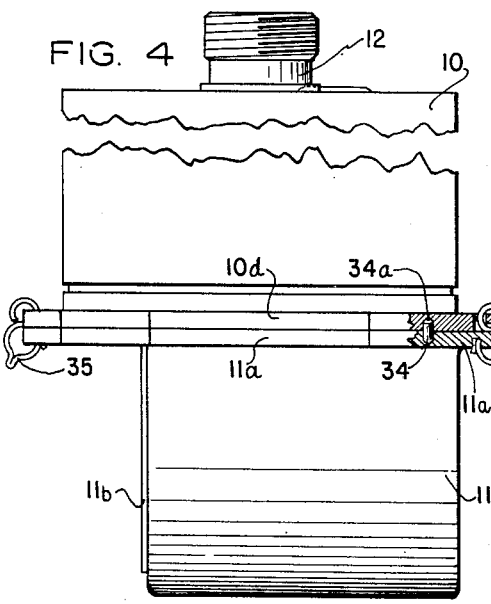
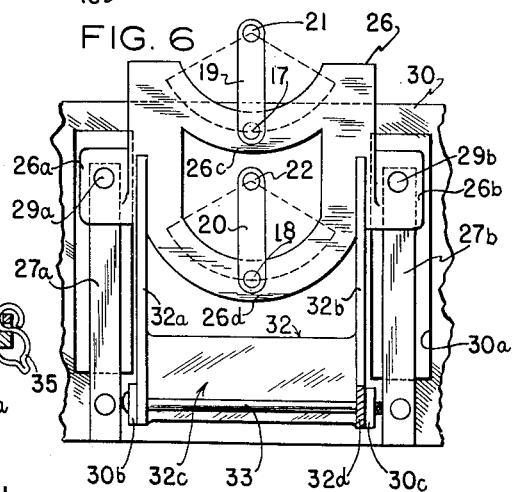
INVENTOR
IVAR JEPSON
BY
McCanna & Morsbach
ATTORNEYS June 19, 1951     I. JEPSON     2,557,437

MAGAZINE TYPE RECORDING APPARATUS

Filed Feb. 17, 1945     4 Sheets-Sheet 4

INVENTOR
IVAR JEPSON
BY
McCanna & Morsbach
ATTORNEYS

Patented June 19, 1951

2,557,437

UNITED STATES PATENT OFFICE 2,557,437

MAGAZINE TYPE RECORDING APPARATUS

Ivar Jepson, Oak Park, Ill., assignor to Sunbeam Corporation, a corporation of Illinois Application February 17, 1945, Serial No. 578,415

5 Claims. (Cl. 346—112)

1

The present invention relates to recording methods and apparatus and more particularly to an improved instrument for producing a strip record of one or more variables.

In the operation of certain operator controlled machines it is good operating practice to provide recording facilities for producing a concealed record of certain variables representative of the performance of a machine during at least certain periods of machine operation. Thus in military aircraft operations, recording of the demands imposed upon an aircraft engine by the pilot of the aircraft is important in determining the pilot's skill in handling the craft and in verifying the authenticity of pilot reports. This may conveniently be done by concurrently and continuously recording the speed and intake manifold pressure of the aircraft engine while it is in operation, and by so interlocking the engine and recording operations that they proceed concurrently. In such an application, the recording facilities must be as compact and light in weight as possible, and should be of two-part construction such that a completed record may be easily and quickly removed from the craft in which the facilities are installed.

It is an object of the present invention, therefore, to provide an improved recording instrument which meets all of the requirements just mentioned and yet is accurate and reliable in operation.

According to another object of the invention, separable record and instrument housings are employed for respectively supporting the record strip driving and marking element operating mechanisms, and improved facilities are provided for accurately orienting the record strip relative to the marking elements as the record housing is mounted upon the instrument housing and for maintaining the record strip orientation as it is moved past the marking elements.

In accordance with still another object of the invention, the accuracy of recording is enhanced by normally permitting at least one of the marking elements to be unrestrictably moved under the influence of its control device and by periodically delivering an impacting force to the marking element which moves the element into marking engagement with the record strip.

According to still another object of the invention, simplification of the recording instrument is obtained by utilizing the record strip driving mechanism to actuate the marking element impacting facilities.

In accordance with yet another object of the

2 invention, the different marking elements are provided with marking parts for making distinguishable indentations upon the record strip, thereby to obviate any possibility of confusion in distinguishing the record lines respectively produced by the marking elements upon the record strip.

It is a still further object of the invention to provide an improved and simple method of recording at least one variable upon a clear film record strip and for then reproducing the record of the variable for visual study.

It is still another object of the invention to provide an improved arrangement for producing a light refracting record indentation on the surface of a clear record film, whereby the passage of light through the film produces a readily distinguishable indication of the position of the indentation upon the film surface.

The invention, both as to its organization and method of operation, together with further objects and advantages thereof, will best be understood by reference to the following specification taken in connection with the accompanying drawings, in which:

Fig. 1 is a side view partially in section illustrating an improved recording instrument characterized by the features of the present invention;

Fig. 2 is a view schematically illustrating the parts of the mechanism provided in the instrument to drive the record strip;

Fig. 3 is a fragmentary detail view illustrating the arrangement for biasing the record strip feed sprockets apart in order to tension the strip transversely thereof;

Fig. 4 is a top perspective view, partially in section, illustrating the facilities for detachably mounting the record housing on the instrument housing;

Fig. 5 is a front face view of the instrument housing with the record housing detached therefrom;

Fig. 6 is a front view of the impacting mechanism provided in the instrument housing for striking the marking elements to move the same into engagement with the record strip;

Fig. 7 is an enlarged fragmentary side view illustrating one form of record indentation produced in the record strip by one of the marking elements;

Fig. 8 is a fragmentary top view of the record strip segment shown in Fig. 7;

Fig. 9 is an enlarged fragmentary side view of a record strip segment illustrating the form of record indentation produced by the other marking element of the instrument;

Fig. 10 is a top view of the record strip segment shown in Fig. 9;

Fig. 11 is a top view of a record strip segment illustrating the form of record lines produced thereon and one method by which the two record lines may be visually interpreted.

Figure 12:
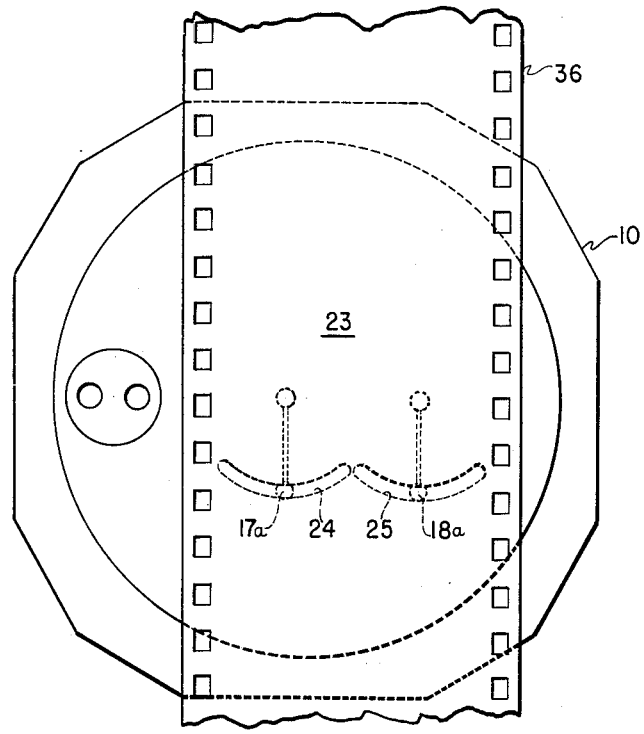
Fig. 12 is a front view of the instrument housing with the record housing removed from the front face thereof illustrating a modified structural arrangement of the marking elements.

Referring now to the drawings, and more particularly to Figs. 1 through 6 thereof, the present improved recording instrument is there illustrated as comprising two detachable housings 11 and 10 which respectively house a record strip 36 and associated driving mechanism, and the marking elements and their associated control and actuating instrumentalities. Specifically, the instrument housing 10 is comprised of a main housing member 10a, a housing shell 10b and an end closure member 10c, the main housing member 10a being provided with an end flange 10d which is adapted for flush mounting upon the instrument panel of an aircraft or the like. This housing has suitably mounted therein a speed indicating tachometer 15 and a manifold pressure indicating gauge 16 which are arranged respectively to control the settings of two marking elements 17 and 18. The speed tachometer 15 is of the electrical type and is provided with an indicating shaft 21, the angular setting of which is determined by the frequency of a control voltage delivered to the driving motor thereof through circuit connections which comprise the contacts of a socket 12 supported upon the end member 10c. It will be understood that the frequency of the current supplied to the driving motor 15 is, in the application referred to above, varied directly in accordance with the speed of the aircraft engine, so that corresponding changes are produced in the angular setting of the indicating shaft 21. At its extended end this shaft fixedly mounts one end of an elongated resilient element 19 which carries the marking element 17 at the opposite or free end thereof. This marking element comprises a pointed recording part 17a, and it will be understood that this part is rotated through an arc having the shaft 21 as a center in response to variations in the motor speed under observation.

The intake manifold pressure gauge 16 similarly includes a rotatable indicating shaft 22, the angular setting of which is changed in response to variations in the pressure within a line 14 which is connected to the intake manifold of the engine under observation through a suitable connector 13 supported upon the end wall 10c of the housing 10. This gauge may be of any conventional type capable of translating changes in the intake manifold pressure of the engine under observation into corresponding variations in the angular setting of the indicating shaft 22. At its extended end, the shaft 22 supports a second elongated resilient element 20 which mounts the marking element 18 at the opposite free end thereof. This marking element comprises a recording part 18a having a pointed end 18b of different configuration than the end 17b of the marking element 17. It is swingable back and forth through an arc having the indicating shaft 22 as a center in response to corresponding changes in the angular setting of the indicating shaft.

At its front open face, the housing 10 is provided with an apertured face plate 23, preferably formed of metal or a suitable plastic, which is clamped to the flanged end 10d of the member 10a at spaced points around its periphery by means of assembly screws 23b. As best shown in Fig. 5 of the drawings, this face plate is provided with spaced arcuate shaped apertures 24 and 25 within which the recording parts 17a and 18a of the two marking elements 17 and 18 are free to move. Normally, i. e., in the unstressed settings of the resilient elements 19 and 20, the parts 17a and 18a project only partially through the face plate 23. They are, however, adapted to be moved into marking engagement with the record strip through operation of an impacting mechanism indicated generally at 9 and supported within the instrument housing 10.

In brief, this mechanism comprises an impacting member in the form of a plate 26 having supporting ears 26a and 26b at the sides thereof which are utilized in resiliently supporting the plate from two frame members 30 and 31 fixedly mounted upon the housing of the gauge 16. More particularly, the ears 26a and 26b are rigidly connected to the ends of a pair of rods 29a and 29b, and these rods are in turn each resiliently supported at the free ends of a pair of leaf springs. Thus the rod 29a is connected to the ends of two leaf springs 27a and 28a having opposed ends which are fixedly anchored to the frame members 30 and 31. The other rod 29b is likewise fixedly connected to the ends of a pair of leaf springs, one of which is shown at 27b, having their opposite ends anchored to the frame members 30 and 31. With the impacting plate thus supported, the impacting parts 26c and 26d thereof are normally held out of engagement with the marking elements 17 and 18 to permit free swinging motion of these elements. Further, since each of the rods 29a and 29b is restrained against lateral movement at both of its ends, the impacting plate 26 is restrained against pivotal movement about its supporting ears 26a and 26b. In other words, this plate is restrained against movement except in a direction normal to the surfaces of its impacting parts 26c and 26d. In preparation for impacting engagement with the marking elements 17 and 18, the plate 26 is adapted to be moved away from the face plate 23 and then released. To permit such movement, the frame member 30 is provided with an enlarged opening 30a within which the springs 27a and 27b and the ears 26a and 26b may move, and the frame member 31 is similarly arranged not to interfere with movement of the springs 28. Movement of the impacting plate 26 away from the face plate 23 is effected through operation of a separable connection between the record strip driving means and the impacting assembly 9, one part of 32 of which is pivotally mounted within the instrument housing 10 upon the outwardly projecting ears 30b and 30c of the frame member 30. This part is comprised of two spaced apart arms 32a and 32b which are connected by a center piece 32c and are engaged with the impacting plate 26 upon the side of this plate which faces the face plate 23. A pivot rod 33 extending through the arms 32a and 32b and mounted upon the ears 30b and 30c is utilized pivotally to support the actuating part 32 upon the frame member 30. At the pivoted end thereof, the arm 32b connects with a third arm 32d which extends normal thereto and projects through an elongated aperture 23a cut in the face plate 23. With this arrangement, the arm 32d may be readily manipulated from outside of the housing 10 for the purpose of producing the desired movement of the impacting plate 26. In order to prevent the plate 26 from oscillating after it has been moved into impacting engagement with the marking elements 17 and 18, a damping spring 30d is anchored at one end to the frame member 30 for sliding engagement with the free end of the spring 28a. The purpose of this damping means is to eliminate spurious impacting of the plate 26 against the marking elements 17 and 18.

As best shown in Fig. 4 of the drawings, the facilities for detachably mounting the record housing 11 and the parts contained therewithin upon the open faced end of the instrument housing 10 comprise a plurality of positioning pins 34 which are driven into accurately positioned holes in the flange 11a of the housing 11 and are adapted to be received within correspondingly positioned holes 34a drilled into the flange 10d of the housing member 10a from the face surface thereof. The flanges 10d and 11a are adapted to be held in face-to-face engagement by means of a plurality of spring clips 35 which are pivotally connected to the flange 10d around the perimeter thereof and are adapted to be stressed over the flange 11a to bring their ends into locking engagement with recesses formed inwardly from the front surface of the flange 11a. The described means for detachably mounting the housing 10 serves accurately to position the two housings relative to each other and to maintain the desired predetermined orientation of the record strip 36 relative to the marking elements when once established.

As indicated above, the record housing 11 is utilized to support the record strip 36 and the driving means for moving this strip past the open face of the housing 10 across the displaced apertures 24 and 25 provided in the face plate 23. A guide plate 37, fixedly mounted within the housing 11 to lie in a plane parallel to and closely adjacent the open face of the housing is provided for guiding the record strip close to the face plate 23 as it moves past the marking elements 17 and 18. This record strip is of the edge perforated type and preferably is comprised of clear unemulsified film of suitable width to completely overlie the apertures 24 and 25. The driving means for moving the strip past these apertures comprise a takeup reel 38 and a feed reel 39 rotatable with drive shafts 38a and 39a and between which are interposed a pair of feed sprockets 40 and 41 carried by a drive shaft 47 and having teeth engageable with the opposing edge perforations of the record strip. The reels 38 and 39 may be similar to camera reels and are detachable from their respective supporting shafts by moving the same axially of the shafts. The housing 11 is provided with an open side which is normally covered by a plate 11b and through which the reels 38 and 39 may be inserted into and removed from the housing 11. Preferably, the reels 38 and 39 are detachably connectable with their respective associated drive shafts 38a and 39a in the manner conventionally employed in moving picture cameras.

As best shown in Fig. 3 of the drawings both of the sprockets 40 and 41 are mounted for rotation with the drive shaft 47, the latter sprocket being slidably splined to this shaft in any conventional manner. For the purpose of tensioning the record strip 36 transversely thereof as it moves across the apertures 24 and 25 in the face plate 23, a compression spring 48 is interposed between the sprocket 41 and a shouldered part of the shaft 47 to bias the two sprockets apart. A common driving motor 42 fixedly mounted within the housing 11 is utilized to drive the reel 38, the sprockets 41 and 42, and the reel 39 at such speeds that the strip 36 is tensioned between each of the two reels and the feed sprockets. Specifically, the reel shaft 38a is adapted to be driven from one end of the motor shaft 43 through a slip clutch 38b and a speed reducing gear train 45. At an intermediate point in this train, there is provided a gear 45a which is mounted for rotation with a takeoff shaft 45b. This shaft, in turn, is connected to drive the feed reel shaft 39a through a second gear train 46 and a slip clutch 39b. At an intermediate point in the latter train there is provided a gear 46a which is mounted upon the shaft 47 to provide a driving connection for the feed sprockets 40 and 41.

To complete the operating connection between the record strip driving motor 42 and the impact plate actuating part 32, a lever and cam connection is provided between the takeoff shaft 45b and the projecting arm 32d of the part 32. This connection comprises a bell crank lever 51 which is pivotally supported by means of a pivot pin 52 within the record housing 11, and is provided with one arm 51b directly engageable with the arm 32d when the housing 11 is mounted upon the housing 10. The second arm 51a of this lever includes a laterally extending cam follower part 51c engaging the camming periphery of a dropoff cam 50 mounted for rotation with the takeoff shaft 45b. A spring 50c tensioned between the lever arm 51b and the housing 11 is utilized to bias the follower part 51c of the lever 51 into engagement with the cam 50.

In the usual installation for an instrument of the character described above, only direct current is available for energizing the driving motor 42 through the bracketed terminals 44. Engageable connectors, not shown, respectively carried by the two housings 10 and 11 may be employed in the circuit for energizing the motor 42, the contacts of the connector carried by the housing 10 being connected through the connector 12 to the available source of direct current. The usual motor of the direct current type is inherently a variable speed device. Accordingly, the motor 42 is provided with a double ended rotor shaft 43, the second end of which works into a speed governor 53 of the mechanical type having the function of maintaining a substantially constant speed of operation of the shaft 43 through suitable speed responsive variations in the load imposed upon the motor 42.

Briefly to consider the manner in which the described recording instrument is used, it may be pointed out that the recording head or housing 11 is first loaded with a record strip 36 by connecting the end of a spool of film carried by a full feed reel 39 to the drum of an empty takeoff reel 38 and then inserting the reels within the housing 11 through the left open side of this housing as seen in Fig. 4 of the drawings with the cover 11b removed therefrom. Incident to this operation, the record strip or film 36 is manipulated over the guide plate 37 to engage the edge perforations thereof with the teeth of the feed sprockets 40 and 41. After the housing 11 has thus been loaded, it may be mounted upon the open face of the instrument housing 10 by bringing the positioning pins 34 into registry with the recesses 34a, moving the flanges 10d and 11a into meeting engagement, and manipulating the spring catches 35 to lock these two flanges together. With the record housing 11 thus mounted upon the instrument housing 10, the record strip 36 is positioned closely adjacent the face plate 23 for movement across the two apertures 24 and 25 within which the recording parts of the marking elements 17 and 18 are free to move. Incident to the described operation of mounting the record housing 11 upon the instrument housing 10, the arm 51b of the lever 51 is brought into a position for actuating the arm 32d of the impacting plate operating part 32.

As indicated above, the record strip driving motor 42 is preferably so interlocked with the controls of the engine under observation that operation of this motor and the engine are concurrently initiated. This may conveniently be done by extending the energizing circuit for the motor 42 through a pair of contacts governed by the switch which controls the ignition circuit of the engine under observation. As thus arranged, operation of the motor 42 is initiated in response to operation of the ignition switch to close the ignition circuit for the engine. With the engine in operation, the tachometer 15 functions variably to position the marking element 17 transversely of the record strip 36 in accordance with the speed of operation of the engine. Similarly, the marking element 18 is variably positioned transversely of the record strip 36 in accordance with the pressure prevailing in the intake manifold of the engine, changes in the angular setting of this marking element being effected under the influence of the pressure gauge 16.

When operation of the motor 42 is initiated in the manner just explained, this motor functions to drive the takeup reel 38 through the gear train 45 and the slip clutch 38b. It also functions to drive the feed reel 39 through the two gear trains 45 and 46 and the slip clutch 39b, and to drive the feed sprockets 40 and 41 through the gear train 45 and that portion of the gear train 46 which connects the takeoff shaft 45b with the gear 46a. From an inspection of Fig. 2 of the drawings, it will be observed that the reel 38, the feed sprockets 40 and 41, and the reel 39 are driven in the same direction. Further, the gear ratios are such that the motor 42 tends to drive the reel 38 through the described driving connecting at a speed considerably higher than the speed at which the feed sprockets 40 and 41 are driven, the speed differential between the end gear of the train 45 and the shaft 38a being absorbed by relative rotary movement between the spring biased and engaging friction parts of the slip clutch 38b. Also, the described driving connection is such that the feed sprockets 40 and 41 are driven at a speed considerably higher than the speed at which the reel 39 tends to be driven through the gear train 46. Here again, the speed differential between the end gear of the train 46 and the shaft 39a is permitted by relative movement between the engaged friction parts of the clip clutch 39b. It will thus be apparent that that portion of the record strip 36 which is moving from the feed reel 39 over the feed sprockets 40 and 41 to the takeup reel 38 is held under tension longitudinally of the strip at all points therealong. Further, the spring 48 in reacting between the feed sprocket 41 and the drive shaft 47 serves to tension the strip 36 transversely thereof in the zone which overlies the two apertures 24 and 25. This tensioning arrangement, in cooperation with the positioning pins 34, serves accurately to orient the strip relative to the instrument housing 10 and more particularly the marking elements 17 and 18, so that a quantitatively accurate record line is produced by each of the two marking elements upon the record strip.

When operation of the driving motor 42 is initiated in the manner described above, this motor also functions periodically and concurrently to move the marking elements 17 and 18 into marking engagement with the surface of the record strip 36 which overlies the guide plate 37. Thus as the takeoff shaft 45b is rotated in a clockwise direction from the position illustrated in Fig. 2 of the drawings, the cam 50 functions to pivot the lever 51 in a counter-clockwise direction to move the arm 51b thereof upward from the position illustrated in Fig. 1 of the drawings. As a result, the actuating part 32 is pivoted in a clockwise direction from its Fig. 1 position to move the impacting plate 26 away from the face plate 23 against the bias afforded by the mounting springs 27 and 28. After a complete revolution of the cam 50, the cam follower 51c of the lever 51 falls off the cam dropoff point 50a permitting the lever 51 to be returned to its normal position under the influence of the biasing spring 50c. When the arm 32d is thus released, the springs 27 and 28 function rapidly to move the impacting plate 26 toward the face plate 23. Due to the release of the energy stored in these springs and the mass of the parts making up the assembly 9, the impacting plate 26 is moved through its normal position to bring the parts 26c and 26d thereof into impacting engagement with the marking elements 17 and 18 and thus move these elements through the apertures 24 and 25 into impacting engagement with the record strip 36. Following the impacting engagement of the plate parts 26c and 26d with the marking elements 17 and 18, the plate 26 tends to oscillate back and forth through its normal position. Such oscillation of the plate is rapidly damped out by the frictional engagement of the damping spring 30d with the end of the spring 28a, the damping being effected with sufficient rapidity to prevent engagement of the impacting plate with the marking elements except during the initial stroke of this plate away from its fully retracted position. It will thus be apparent that so long as the motor 42 is operating, the cam 50 functions to actuate the impacting plate 26 so that the marking elements 17 and 18 are periodically moved into marking engagement with the record strip 36. Further, since the motor 42 is constrained to operate at a constant speed under the influence of the speed governor 53, the record strip 36 is moved at a constant speed by the feed sprockets 40 and 41 and the marking elements are engaged with this strip on an absolute periodical basis. As a result, the marks produced upon the record strip 36 are equally spaced longitudinally of this strip to provide an accurate measure of the time elapsing in the compilation of a specific record.

As indicated above, the recording parts 17a and 18a function to produce record indentations in the surface of the record strip 36 each time the marking elements 17 and 18 are struck by the impacting plate 26. These recording parts are respectively provided with marking points 17b and 18b of different configuration in order that distinguishable record lines may be produced upon the record strip. Specifically, the point 17b is of conical configuration such that cone shaped depressions are produced in the record strip in the manner illustrated in Figs. 7 and 8 of the drawings. The marking point 18b of the recording part 18a, on the other hand, is of wedge shaped configuration, such that wedge shaped indentations are formed in the surface of the record strip in the manner shown in Figs. 9 and 10 of the drawings. The character of the record lines thus produced upon the record strip 36 is illustrated in Fig. 11 of the drawings, that produced by the recording part 17a being indicated by the dotted line 36a and that produced by the recording part 18a being indicated by the dash line 36b. If desired, the film 36 may have suitably spaced time legends, graduated in minutes, permanently inscribed thereon in order that the various portions of the record lines may be correctly related to the time of their formation in reading the strip, and the total elapsed operating time of the engine may be computed. In this regard it will be understood that at any specific point along either of the two lines 36a and 36b, the transverse displacement between the line point and the left edge of the strip is precisely related quantitatively to the speed or manifold pressure which the point represents. Accordingly, a scaled plate 55 may conveniently be superimposed upon the record strip in translating the record line information into values of speed and pressure respectively. This plate is preferably comprised of a transparent material and is provided with two arcuate scales 56 and 57 respectively graduated in terms of speed and pressure to convert the speed and pressure values indicated by the lines 36a and 36b into numerical values. Along its left edge, the plate 55 is provided with two indexing marks 55a which are adapted to be aligned with the left edge of the strip 36 in order accurately to orient the scales 56 and 57 relatively to the record lines 36a and 36b. It will be apparent that by using this plate, the information provided by the record lines 36a and 36b may readily be converted into usable form.

An alternative and preferred method of visually inspecting or studying the record lines produced upon the record strip 36 is that of utilizing an ordinary projector to project the lines upon a screen. In this regard, it is pointed out that preferably the record strip film 36 is of the standard 35 millimeter size such that any commercial projector may be employed in reproducing the record lines upon a screen. Such reproduction obviously results in considerable enlargement and accentuation of the variations in the recorded variables, thus facilitating an interpretation of the same.

In connection with the projection method of reproducing the record lines carried by the strip 36, it is pointed out that the configuration of the record indentations produced by each of the two recording parts 17a and 18a in the surface of the strip is of great importance. Specifically, the walls 36c and 36d of each indentation are angularly so disposed relative to the surface of the strip that light rays impinging upon the strip in a direction normal to the surface thereof are refracted from a path normal to this surface in passing through the strip. Thus, the walls 36c of each indentation produced in the record strip 36 by the recording part 17a are disposed at an angle of approximately 45 degrees relative to the surface of the strip. Accordingly, if a light ray impinges upon any part of this wall from a direction normal to the surface of the strip, it is refracted to follow a path extending outwardly from the opposed surface of the strip at an angle of approximately 45 degrees relative thereto. The same is true of the walls 36d of each depression formed by the point 18b of the recording part 18a in the surface of the record strip, which walls are disposed at an angle of approximately 30 degrees relative to the surface of the strip. Due to this light ray refraction, the light rays impinged upon the indentations are refracted to follow paths removed from the area of the screen when the projection method of reproducing the record lines is employed. Accordingly, each indentation appears as a dark spot upon the screen to provide a positive point indication of its position within the field of observation.

In employing the projection method of reproduction, it is desirable to provide a reference line longitudinally of the film from which variations in the lines 36a and 36b may be measured. Such a line may, of course, be permanently inscribed longitudinally of the strip in the manufacture thereof or before the strip is used. A preferable method is that of employing an additional marking element 61 which projects through an aperture 62 in the face plate 23 and is provided with a conical point for scratching a reference line indentation upon the record strip 36 along the left edge thereof as viewed in Fig. 11 of the drawings, incident to movement of the strip 36 across the guide plate 37. This marking element may be supported at the free end of a resilient strip 63 having its opposed end connected to the face plate 23 at a point remote from the aperture 62. With this arrangement the reference line marking element 61 is biased to engage the record strip by the resilient element 63, and occupies a fixed position relative to the indicating shafts 21 and 22 of the two instruments 15 and 16 such that absolute accuracy is maintained in the spacing of the record lines 36a and 36b from the reference line.

Figure 13:
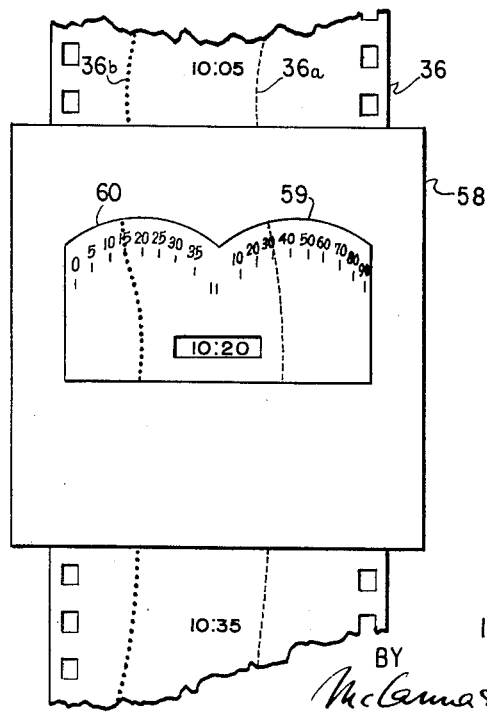
Fig. 13 is a top view of a record strip segment illustrating the type of record produced by the arrangement shown in Fig. 12 and one method by which the two record lines may be concurrently interpreted.

In the arrangement illustrated in Figs. 1 through 6 of the drawings, the marking elements 17 and 18 are arranged in spaced apart relation in the direction of movement of the record strip 36. As a result, the record lines 36a and 36b may conceivably cross under certain conditions of engine speed and intake manifold pressure. In order to obviate any possibility of confusion in the interpretation of the record lines, occasioned by crossing of the lines or a small spacing therebetween, the arrangement illustrated in Fig. 12 may be employed. As there shown, the instruments 15 and 16 are so positioned within the housing 10 that the marking elements 17 and 18 are spaced apart along a line extending transversely of the record strip 36. In consequence of this change, the apertures 24 and 25 provided in the face plate 23 are cut to overlie non-overlapping longitudinal segments of the record strip 36. The character of the record lines 36a and 36b produced upon the record strip 36 with this modified structure is illustrated in Fig. 13 of the drawings. Scale interpretation of these lines requires the use of a scaled plate 58 in which the arcuate pressure and speed scales 59 and 60 are arranged in side-by-side relationship across the face of the plate. Aside from the differences specifically noted, the Fig. 12 embodiment of the instrument may be exactly the same as the first embodiment thereof as illustrated in Figs. 1 to 6, inclusive, and described above.

While there have been described what are at present considered to be the preferred embodiments of the invention, it will be understood that various modifications may be made therein which are within the true spirit and scope of the invention as defined in the appended claims.

I claim:

1. A recording instrument of the type employing a movable record strip comprising in combination, two interfitting and separable housings, said record strip being positioned in one of said housings, the other of said housings having an open face, driving means in said one housing for driving said record strip past the open face of said other housing at a constant speed, a marking element in the other of said housings, means for moving said marking element across said record strip at the open face of said other housing in accordance with a variable to be recorded, and means in said other housing actuated by the driving means in said one housing for periodically moving said marking element momentarily into engagement with said record strip.

2. A recording instrument of the type employing a movable record strip comprising in combination, two interfitting and separable housings, said record strip being positioned in one of said housings, the other of said housings having an open face, a marking element in the other of said housings, means for moving said marking element across said record strip at the open face of said other housing in accordance with a variable to be recorded, driving means in one of said housings for driving said record strip at a constant speed, and means in the other housing actuated by said driving means for periodically moving said marking element momentarily into engagement with said record strip.

3. A recording instrument of the type employing a movable record strip comprising in combination, two interfitting and separable housings, one of which is adapted to house said record strip, the other of said housings having an open face, driving means in said one housing for driving said record strip at a constant speed past the open face of said other housing, a marking element mounted in the other of said housings, means for moving said marking element across said record strip at the open face of said other housing in accordance with a variable to be recorded, impacting means for striking said marking element to move the same into marking engagement with said record strip, and a separable connection including interengaging parts respectively mounted in said housings for connecting said impacting means with said driving means periodically to actuate said impacting means.

4. A recording instrument of the type employing a movable record strip comprising in combination, two interfitting and separable housings, one of which is adapted to house said record strip, the other of said housings having an open face, driving means in said one housing for driving said record strip at a constant speed past the open face of said other housing, a marking element mounted in the other of said housings, means for moving said marking element across said record strip at the open face of said other housing in accordance with a variable to be recorded, impacting means for striking said marking element to move the same into marking engagement with said record strip, and a separable connection including disengageable levers respectively mounted in said housing for connecting said impacting means with said driving means in a manner such that said impacting means is periodically actuated.

5. A recording instrument comprising an instrument housing having a face, a face plate covering said face and provided with two displaced apertures therethrough, a record housing detachably mounted upon the face of said instrument housing, record strip driving means in said record housing, means in said record housing for guiding the record strip closely adjacent the surface of said plate through which one of said apertures extends, a marking element adapted to be moved into engagement with said record strip through said one aperture, means in said instrument housing for moving said marking element across said record strip in accordance with a variable to be recorded, and means actuated by said driving means and including disengageable parts, one of which extends through the other aperture in said face plate, for periodically moving said marking element into engagement with said record strip.

IVAR JEPSON.

REFERENCES CITED

The following references are of record in the file of this patent:

UNITED STATES PATENTS

| Number | Name | Date |
|---|---|---|
| 1,039,724 | Gallaher | Oct. 1, 1912 |
| 1,119,956 | Heath | Dec. 8, 1914 |
| 1,299,427 | Chapman | Apr. 8, 1919 |
| 1,360,823 | Thwing | Nov. 30, 1920 |
| 1,415,499 | Tuttle | May 9, 1922 |
| 1,447,913 | Trowbridge et al. | Mar. 6, 1923 |
| 1,459,087 | Cox | June 19, 1923 |
| 1,490,586 | Bruhn | Apr. 15, 1924 |
| 1,762,942 | Wright et al. | June 10, 1930 |
| 1,847,918 | Blanchard | Mar. 1, 1932 |
| 1,861,697 | Hickok et al. | June 7, 1932 |
| 1,972,555 | Fear | Sept. 4, 1934 |
| 2,092,064 | Hanna et al. | Sept. 7, 1937 |
| 2,108,919 | Grigoriu | Feb. 22, 1938 |
| 2,111,902 | Reynolds et al. | Mar. 22, 1938 |
| 2,119,339 | Mayo | May 31, 1938 |
| 2,141,964 | Yonkers | Dec. 27, 1938 |
| 2,232,589 | Chappell et al. | Feb. 18, 1941 |
| 2,264,181 | May | Nov. 25, 1941 |
| 2,445,272 | Keegan | July 13, 1948 |

FOREIGN PATENTS

| Number | Country | Date |
|---|---|---|
| 221,077 | Great Britain | Sept. 4, 1924 |